Dec. 27, 1938. A. SONSTHAGEN Re. 20,956

ROLL AND BAR GRINDING MILL

Original Filed Aug. 20, 1934 2 Sheets-Sheet 1

INVENTOR
ASBJORN SONSTHAGEN
BY Gustav Drewitz
ATTORNEY

Dec. 27, 1938. A. SONSTHAGEN Re. 20,956

ROLL AND BAR GRINDING MILL

Original Filed Aug. 20, 1934 2 Sheets-Sheet 2

INVENTOR
ASBJORN SONSTHAGEN
BY Gustav Drew
ATTORNEY

Reissued Dec. 27, 1938

Re. 20,956

UNITED STATES PATENT OFFICE 20,956

ROLL AND BAR GRINDING MILL

Asbjorn Sonsthagen, London, England

Original No. 2,024,073, dated December 10, 1935, Serial No. 740,575, August 20, 1934. Application for reissue December 7, 1937, Serial No. 178,542. In Great Britain March 17, 1933

3 Claims. (Cl. 83—22)

This invention relates to apparatus for grinding material in a more or less viscid condition and refers primarily to mills of the kind in which the material is acted upon by a moving body, a disc or roller for example, with which is associated a stationary member which may comprise a bar or a group of bars, beneath which the material passes whilst acted upon by the moving body.

The present improvements may also be employed in mills of the kind in which double or multiple rollers are employed.

It has been proposed, in order to improve the efficiency of mills such as those above referred to, to subject the material at the "nip" or point where it is entering the gap, to a considerable amount of pressure.

Where it is desired that the material shall be finely ground, it is necessary that the gap or space between the grinding element shall be very small. In order to maintain an output, the fineness of which does not vary, it is essential that the spacing of the parts just referred to shall remain constant.

In practice, however, it is found that due to distortion or wear, the accuracy of the original setting cannot be maintained for any considerable period of time and frequent trueing of the parts is necessary.

The present invention has for its object certain improvements designed to overcome the aforesaid difficulties and by means of which it is possible to retain the parts in their desired adjusted position so that the standard of fineness of the material passed through the mill is readily maintained.

According to the present invention, in order to overcome the aforesaid objections, fluid actuated means are provided whereby one member or a group of members can be subjected to pressure urging it towards the cooperating member in a manner such that the desired gap for the passage of the material is preserved under all conditions of wear or distortion.

In the case where the length of the bar is comparatively great as, for example, where a comparatively long roller is employed, the difficulty of maintaining a gap of constant width may be due to flexure of the said roller. On the other hand, with a short roller no flexing thereof takes place, but the fault may be due to wear of the bar or the roller itself or its bearings or heating of the parts.

In such a case as that first above referred to the bar is preferably so constructed that it may flex or bend.

The original setting may provide a gap of only a fraction of one thousandth of an inch up to a few thousandths, and this flexible bar must be kept firmly up to its work without any yield to increase the width of the gap during the performance of its work.

The fluid actuated means may comprise a simple arrangement of hydraulically operated plungers bearing against the back of the bar.

A pressure gauge would be provided and provision made for regulating the pressure with which the plungers bear upon the bar.

In order that the invention may be the better understood, it will now be described with reference to the appended drawings, in which:—

Referring to the accompanying drawings, Figs. 1 to 4, 1 indicates the bar which cooperates with the moving body, which, in the present instance, is assumed to be a roller, indicated by 2, although, as previously stated, the invention is equally applicable to "disc" or other mills.

As already stated, one member or a group of members may be adapted to act as the flexible member and for practical purposes, as will be readily understood, it is more convenient that the bar should act as the flexible member. As hereafter explained, however, the roller may form the flexible member.

Figure 3:
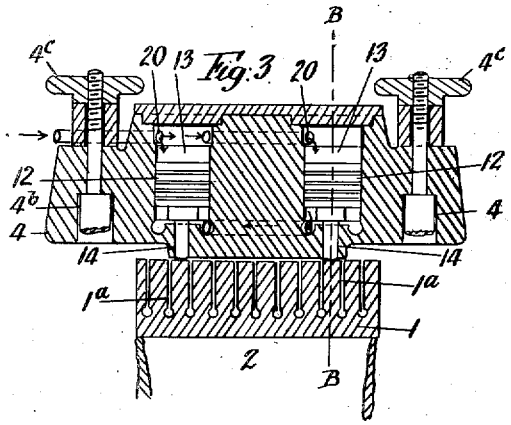
Fig. 3 is a transverse section to a larger scale than that of Figs. 1 and 2 taken upon line A—A, Fig. 2.

One method of treating the bar to provide the desired flexibility is shown in Fig. 3, on reference to which it will be seen that the bar is provided with a number of cuts 1*a* extending inwards from the back of the bar for a convenient distance. The number of cuts, and the depth thereof may be varied as may be found necessary or desirable, it being understood that the degree of flexure is actually very small.

The bar is provided upon the front or that side on which the material enters the machine with a longitudinally disposed web or vane 1*b*, the face of which is inclined so that there is a gradually decreasing space leading to the "nip", that is to say, the point where the material actually passes between the active face of the bar and the surface of the roller or other moving body.

4 indicates a bridge piece carrying the bar 1 the ends of said bridge piece being attached to the frame 4*a* of the machine by means of the screws 4*b* and nuts 4*c*.

Figure 1:
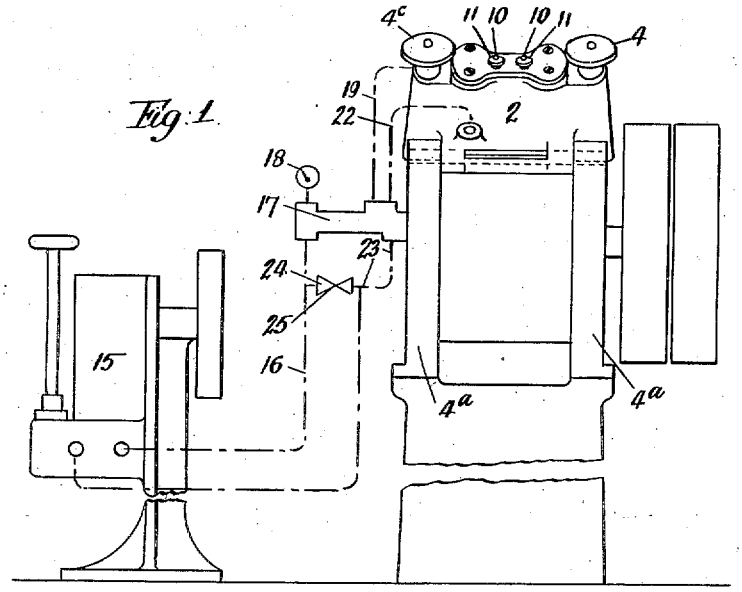
Fig. 1 is a part diagrammatic view of a machine embodying one form of the present invention.
Figure 2:
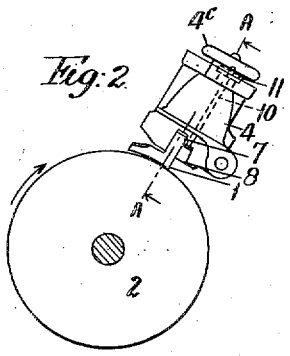
Fig. 2 is an end view of the bar and its associated parts.
Figure 4:
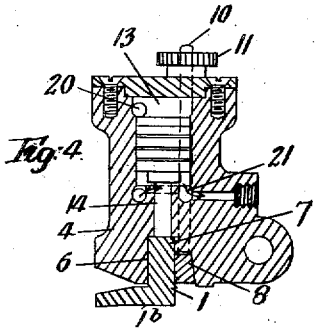
Fig. 4 is a transverse section to the same scale as that of Fig. 3, taken upon line B—B of Fig. 3.

A method of attaching the bar to the bridge piece is clearly shown in Figs. 2 and 4, on reference to which it will be seen that the bridge piece is provided upon its inner face with a longitudinally disposed channel or recess 6. The bar 1 is of substantially L-shaped cross-sectional outline, the base of the bar, indicated by 7, fitting within the aforesaid channel 6. The bar is held to position by means of a wedge 8, for which a recess is provided, said wedge having one face bearing against the adjacent surface of the bar 1 and being drawn into and held against displacement in its recess by means of screws 10 secured at one end to the back of the wedge, and for which screw nuts 11 are provided.

In order to force the bar against the active surface of the roller, hydraulically operated pistons, indicated by 12, are provided, each working in a cylinder 13 formed upon the bridge piece. Each piston is provided with a rod 14, the outer end of which engages the rear edge of the base of the bar 1.

The cylinders, in the arrangement illustrated and the bar or bridge piece, are shown as a unitary structure, but under some circumstances it may be found desirable to employ independent cylinder units located at the desired points along the length of the bar, the pressure applied by each piston being the same or varied, as desired.

According to the arrangement illustrated, the necessary pressure is supplied by means of the pump 15 connected by the pipe 16 to the casing 17, upon which is provided a pressure gauge 18. The casing has connected to it a pipe 19, to which are connected the two cylinders, one being in series with the other and being provided with inlet and exhaust ports indicated respectively by 20 and 21. The exhaust or return pipe is indicated by 22, said pipe communicating with a passage in the casing 17, a pipe 23 leading from said passage to the pump inlet. The pipes 16 and 23 are connected at 24, a cock 25 being provided as shown. By this means it is possible to regulate or release the pressure with which the bar is forced against the active surface of the moving member.

The pressure, indicated by the gauge 18, will balance the pressure to which the material, as it passes to the bar, is raised, and the width of the gap through which the material passes will be dependent upon this balance so that a certain width of gap for a certain material can be expressed in terms of pressure. If, therefore, the width of gap necessary for treating any particular material is known, it is possible, by regulating the pressure, to secure the desired width of the gap.

It will be understood that in practice, when the mill is working, the compressed material is tending to force the bar away from the moving body, the limit of the bar's movement away from the surface cooperating therewith determining the working width of the gap.

Figure 11:
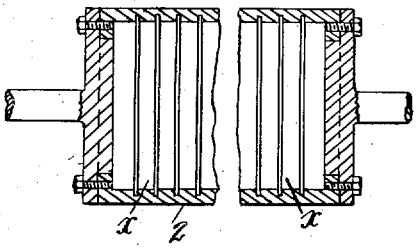
Fig. 11 is a sectional view of a roller capable of flexure in the direction of the length.

As previously stated, the flexible member may be the roller, and in order that this may be so, the inner surface of the roller may be scored at intervals throughout its length, as shown in Fig. 11. In the drawings, *x* indicates the internal circumferential grooves or scorings.

Figure 5:
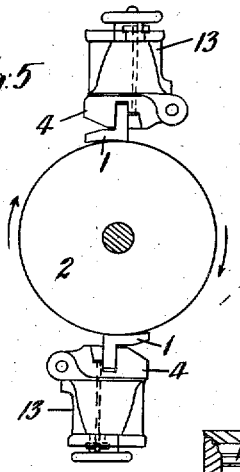
Fig. 5 is an end view showing an arrangement whereby a plurality of grinding bars are employed in conjunction with a roller.
Figure 6:
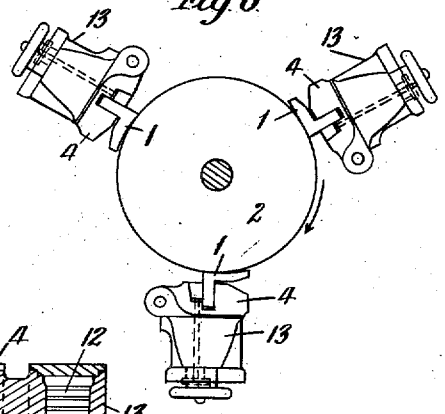
Fig. 6 shows a modification of the arrangement shown in Fig. 5.
Figure 7:
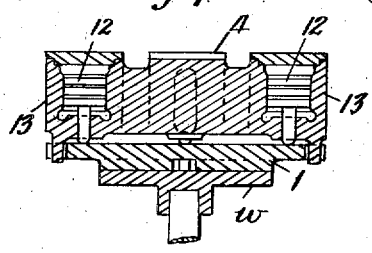
Fig. 7 is a sectional plan showing a plurality of grinding bars applied to a disc.
Figure 8:
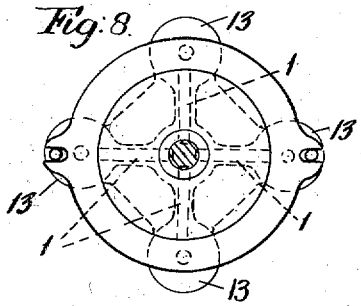
Fig. 8 is a front view of the arrangement shown in Fig. 7.

Examples of arrangements designed to secure the above results are shown in Figs. 5 and 6, in which, for the sake of simplicity, only the bar, its supports and the roller 2 are shown. In Fig. 5 the pressure applied to the roller by the bar 1 at one point is balanced by arranging a second bar at a point diametrically opposite to said bar 1.

In Fig. 6 three bars are provided, disposed at equidistant intervals around the circumference of the roller 2. The number of bars could be increased where the roller is of large diameter, but in all cases they would be so disposed that pressure applied by one bar is more or less met or balanced by the pressure of the other or others, as the case may be.

The system of balancing pressures such as just described may, with equal advantage, be extended to disc mills, and in Figs. 7, 8 and 9 and 10 are illustrated various arrangements whereby pressure acting upon one side of the center line of the disc *w* and tending to cause it to, as it were, rock in its plane of rotation, can be counteracted. Thus, in Figs. 7 and 8 a plurality of bars are provided which all act upon the face of the disc, but they are so disposed that instead of a local pressure acting upon the disc upon one side of the centre thereof, there is an even pressure which, in effect, is distributed over the whole surface of the disc.

In the examples just described, the pressure is acting upon one side of the disc only and tending to thrust it backwards.

For practical purposes, this pressure is inconvenient and may necessitate a construction which will cause the machine to be unnecessarily heavy and cumbersome.

Figure 9:
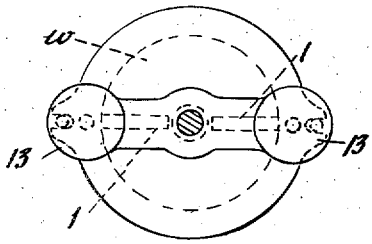
Fig. 9 is a front view showing a modification of the arrangement according to Fig. 8.
Figure 10:
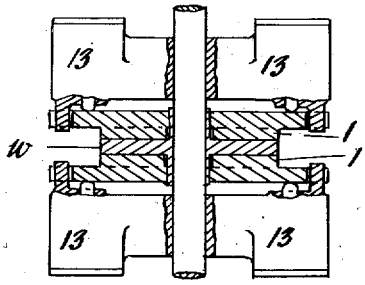
Fig. 10 is a section plan of the arrangement according to Fig. 9.

In the arrangement shown in Figs. 9 and 10 the difficulty is met by using both sides of the disc and providing bars upon both sides of the said disc. The number of cylinders and pistons will, of course, depend upon the length of the bar or the diameter of the disc as the case may be.

It is obvious that the automatic arrangement must provide for the application and the maintenance of a steady pressure towards the gap and firm rigidity in the opposite direction.

The desired rigidity in the opposite direction must take into account compensation for wear and of step by step adjustments to maintain a certain amount of grinding pressure.

The flexibility of the grinding bar makes it possible to true it up on the straight portion and afterwards flex it to take the shape of the worn roller when in position to do its work.

If the pressure applying devices are in the form of individual units, the said units would be so connected as to ensure a uniform pressure in the whole system.

In certain instances it may be of advantage that the plungers do not move until the load reaches a predetermined point.

For grinding machines which need very little movement of fluid, pumps may be dispensed with, as it is possible, by simple means, to force a plunger into the pressure chamber, to place the fluid under the desired pressure.

When the grinding bar acts against a roller, the pressure will be uniform for each plunger, as every inch of the length presents the same surface per revolution.

With a disc, however, such is not the case as it presents more surface, as a radius is increased, reaching its maximum at the periphery.

As applied to multiple roller mills or refiners, the pressure between the grinding surfaces could be obtained by the application of the pressure producing devices to any one or more of the rolls.

I claim as my invention:

1. A grinding mill comprising a pair of members mounted for relative movement closely adjacent each other; one of the members presenting to the other member an extended surface of wide area; the other substantially continuously co-operating with said surface along an unbroken, substantially or approximately straight long narrow line transverse to the direction of said relative movement to form with this surface a grinding gap; one of said members being throughout said line bendable toward the other member; and hydraulic pressure means engaging the bendable member at distances spaced in the direction of said line and pressing it toward the other member throughout said line with a constant pressure of constant intensity; the pressure-intensity and points and direction of application of said pressure means and the degree of bendability of the bendable member being such that said members are at all times held firmly at their correct distance apart upon opposite sides of the gap and through all parts of the said line both before and after wear of said members in use, the said line of co-operation being at all times continuous, integral and free from sudden bends or angles in a plane normal to said surface said members, at the grinding face thereof, comprising rigid material.

2. A grinding mill comprising a disc member mounted for rotary movement and having an extended surface of wide area; and a one-piece bar disposed closely adjacent thereto along a substantially or approximately straight unbroken long narrow line transverse to the direction of movement of the disc, to form therewith a grinding gap; said bar being throughout said line bendable toward the disc; and hydraulic pressure means engaging the bar at distances spaced in the direction of said line and pressing said bar toward the disc member throughout said line with a constant pressure of constant intensity; the pressure-intensity and points and direction of application of said pressure means and the degree of bendability of the bar being such that said members are at all times held firmly at the correct distance apart upon opposite sides of the gap through all parts of said line both before and after wear of said bar and member in use; the line of said gap being at all times continuous, integral and free of sudden bends or angles in a plane normal to said surface.

3. A grinding machine for paint and the like comprising a pair of normally inflexible grinding members of rigid material mounted for relative grinding movement in substantial grinding engagement, thereby forming a grinding nip therebetween; one of the members having an extended surface of wide area; the other member continuously substantially engaging said surface in grinding relation along an unbroken substantially or approximately straight long narrow line transverse to the direction of said relative movement, and being transversely weakened along the length of its grinding nip contact whereby it is bendable along any part of its length out of said line toward said other member; and whereby it may be relatively flexed upon the nip contact of the other normally inflexible member, to accommodate for joint wear of the nip contacting surfaces of both members; and pressure means for urging the weakened member into flexing rigid contact with the inflexible member; said pressure means engaging the bendable member remote from its ends at distances spaced in the direction of said line and pressing said members together throughout said line with a constant pressure of constant intensity; the pressure-intensity and points and direction of application of said pressure means and the degree of rigidity and bendability of the bendable member being such that all parts of the rigid grinding face of said flexible member are at all times positively rigidly held at the correct distance from, and against movement from, said surface and substantially in rigid grinding relation therewith throughout all parts of said line both before and after uneven wear of said members in use; said bendable member being, at the line of grinding engagement at all times, rigid, continuous, integral and free from sudden bends or angles in a plane normal to said surface.

ASBJORN SONSTHAGEN.